United States Patent [19]

Loubet

[11] B 4,014,733

[45] Mar. 29, 1977

[54] APPARATUS FOR PRODUCING MULTIPLE PANE WINDOWS

[75] Inventor: Jacques Charles Loubet, Montmorency, France

[73] Assignee: Saint-Gobain Industries, Neuilly-sur-Seine, France

[22] Filed: Oct. 16, 1974

[21] Appl. No.: 515,368

[44] Published under the second Trial Voluntary Protest Program on April 6, 1976 as document No. B 515,368.

Related U.S. Application Data

[63] Continuation of Ser. No. 335,016, Feb. 23, 1973, abandoned.

[30] Foreign Application Priority Data

Mar. 2, 1972 France .............................. 72.07230

[52] U.S. Cl. ................................ 156/446; 65/348; 65/349; 156/498; 156/499; 156/500
[51] Int. Cl.² ........................................ B32B 31/12
[58] Field of Search ................ 65/43, 57, 58, 120, 65/152, 272, 348, 349; 156/99, 102, 106, 107, 109, 244, 304, 305, 322, 104, 446, 447, 498, 499, 500; 118/232, 500, 503

[56] References Cited

UNITED STATES PATENTS

| 2,275,811 | 3/1942 | Woefel | 425/110 |
|---|---|---|---|
| 3,207,589 | 9/1965 | Crowley | 65/152 |
| 3,658,502 | 4/1972 | Shepherd | 65/58 |

FOREIGN PATENTS OR APPLICATIONS 2,128,717 12/1971 Germany .............................. 156/109

*Primary Examiner*—Caleb Weston
*Attorney, Agent, or Firm*—Pennie & Edmonds

[57] ABSTRACT

A conveyor and a cooling table define a path of advance for assemblies comprising two or more sheets of glass of the same dimensions held in juxtaposition and at a fixed spacing by a clamping jig. Heating means heat an edge of the glass sheets and are followed by a nozzle which injects a fusible sealant bead between the sheets along that edge prior to cooling at the cooling table of the bead so formed. A crank and associated clamps rotate the assembly about its corners for application of the bead along successive edges.

5 Claims, 15 Drawing Figures

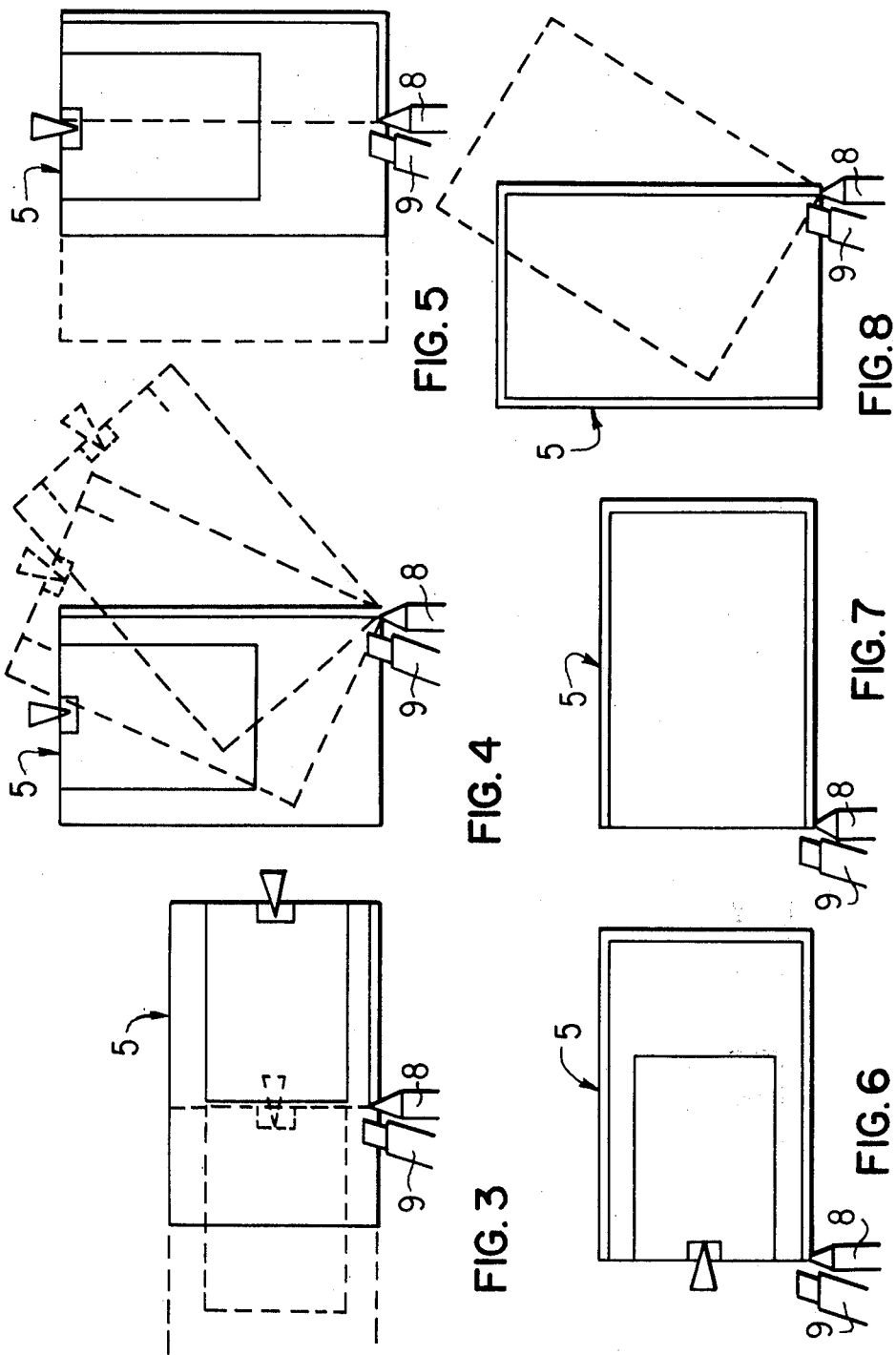

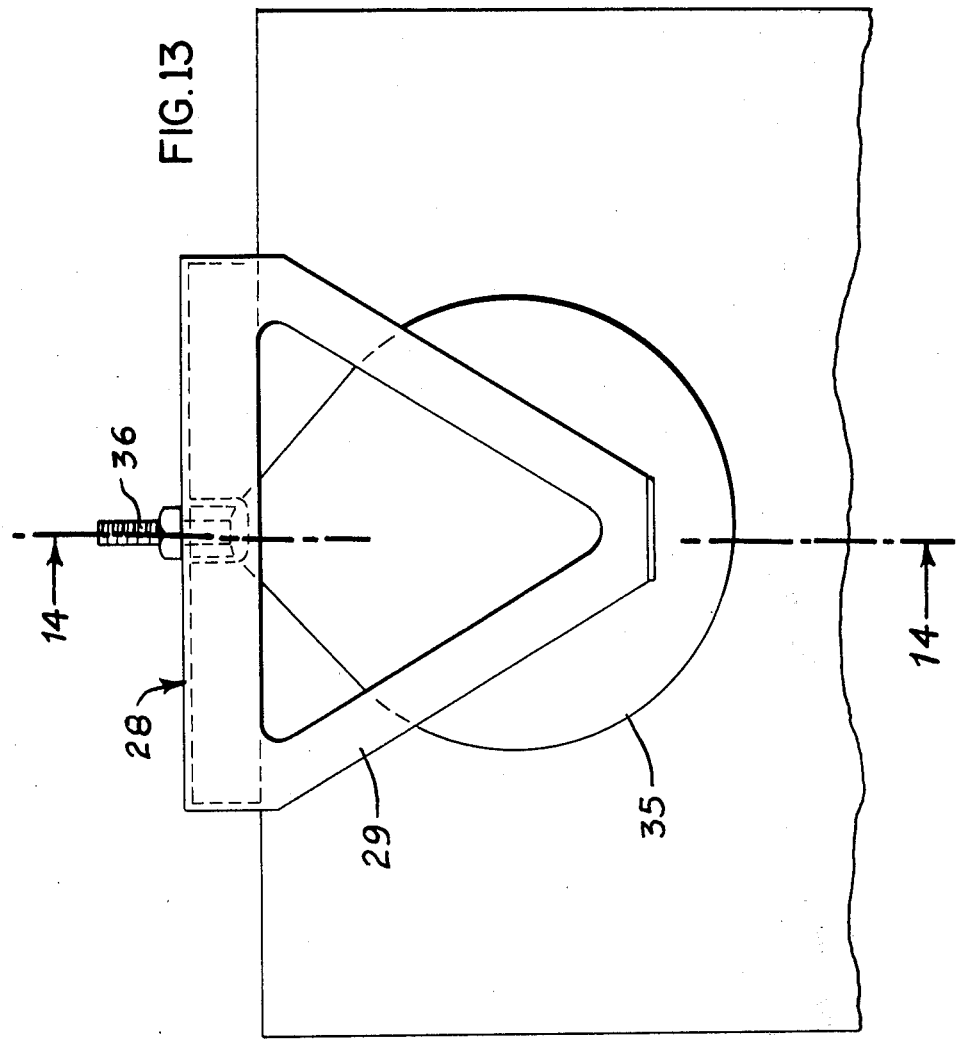
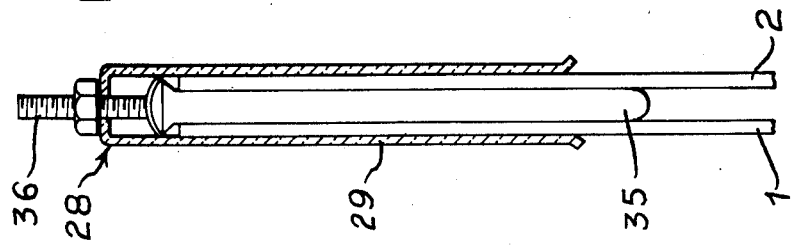

APPARATUS FOR PRODUCING MULTIPLE PANE WINDOWS

This is a continuation of application Ser. No. 335,016 filed Feb. 23, 1973, now abandoned.

The present invention pertains to apparatus for the manufacture of thermally insulating windows comprising two or more sheets of glass separated by air spaces and joined at their periphery by a bead or filament of heat fusible spacing material of the type known as "Hot Melt". Such windows will hereinafter be termed multiple pane windows.

More particularly the invention provides apparatus making it possible to effect continuous injection of the spacing filament in situ at the periphery of the sheets of glass while the latter are temporarily held fixedly with respect to each other by a temporary, removable jig or spacing means.

A difficulty in the manufacture of multiple pane windows comes from the fact that the heat fusible materials suitable for use as the spacing and sealing filament do not adequately adhere to the surfaces of the glass unless, when they are applied, they are sufficiently fluid or liquid to wet the glass for an adequate length of time. When however they are sufficiently fluid for this purpose, they do not possess sufficient viscosity to sustain the sheets of glass in properly spaced relation until the filament made thereof can cool and harden.

Another difficulty heretofore encountered in the manufacture of multiple pane windows results from the fact that the spacing filament must provide a watertight seal around the entire periphery of the window. It is difficult to obtain such a seal at the junction point or points along the length of the filament, as where the beginning and end points of the filament are joined, without careful matching of temperatures of the ends to be joined.

The apparatus of the invention makes it possible to manufacture multiple pane windows in a commercially acceptable manner.

The apparatus of the invention comprises a stationary injection nozzle which is fed with a melted heat-fusible material and which is disposed substantially vertically with the nozzle pointing upwards. A cooling plate or table is provided adjacent to the injection nozzle to support the window and the newly injected sealing material as it advances past the nozzle. This table is provided with means to regulate its temperature and with a surface, fixed or movable, against which an edge of the sheets and the sealant newly injected between the sheets along that edge may rest, this surface being of such a character as to prevent adhesion of that injected material to the cooling table.

The apparatus further includes heating means which preheat the glass before the injection of the spacing bead between the panes thereof, and spacing means which make it possible to hold the panes of glass in the proper relative position, one of these spacing elements being preferably disposed adjacent the injection nozzle.

The apparatus also comprises means which advance the panes of glass with respect to the nozzle and finally means making it possible to rotate the panes so as to negotiate the corners thereof.

In the preferred embodiment of the invention the heating means for the glass panes in the immediate vicinity of the nozzle comprise a metallic element in contact with the adjacent faces of the two panes between which the sealant is to be injected, this heating element being sustained at the desired temperature by electric heating. This heating element may also serve to space the panes at the desired separation.

According to another feature of the invention, means are provided to effect circulation of air between the panes of glass in the vicinity of the bead of injected sealing material. This circulation, which is intended to effect evacuation of any vapors given off by the melted sealing material, may be produced by an opening disposed in the metallic heating element. The desired circulation may however be provided by injecting or withdrawing air through suitably positioned holes in a removable jig or spacer element which holds the panes at the desired separation.

It is desirable to provide heating means to reheat the bead already injected whenever injection is resumed after being interrupted. This occurs particularly when negotiating the corners of an assembly of panes in process of being sealed.

Such a reheating is also necessary when the bead has been nearly completed, i.e. when the end of the bead is to be joined to the beginning point thereof.

BRIEF DESCRIPTION OF THE DRAWINGS

The invention will now be further described in terms of a number of presently preferred exemplary embodiments thereof and by reference to the annexed drawings wherein:

FIGS. 3 to 9 are diagrammatic views illustrating successive positions of the assembly of glass panes in the course of injection of the sealing filament;

FIG. 13 is a plan view of a device according to the invention for holding in spaced relation two panes while the sealing filament is applied part way about the periphery between the two;

FIG. 14 is a sectional view taken on the line 14—14 of FIG. 13; and

DESCRIPTION OF THE PREFERRED EMBODIMENTS

Figure 1:
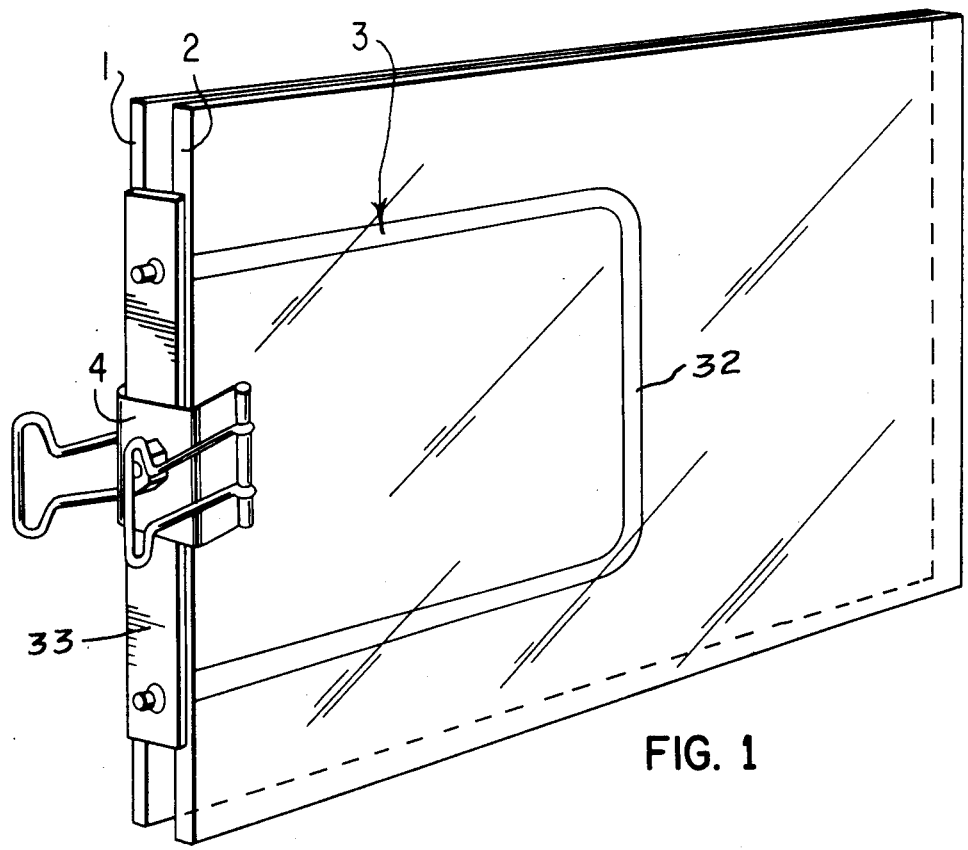
FIG. 1 is a diagrammatic representation of an assembly of two panes of glass held in suitably spaced relation by a removable jig or spacing clamp for application to that assembly of a sealing filament in accordance with the invention.

In FIG. 1 two sheets of glass 1 and 2 are shown temporarily supported parallel to each other and at a suitable small separation by means of a spacing device or jig generally indicated at 3. In the embodiment illustrated the jig comprises a U-shaped tube 32 affixed to a plate 33 and a spring clamp 4 affixed to that plate and adapted to press the two glass sheets against the tube 32. The tube 32 is preferably made of polyteturea-fluorethylene (PTFE) in order to resist the high operating temperature and to avoid applying cold points to the glass. The tube may be pierced with one or more holes along its length so that air or other suitable gas introduced into the tube under suitable low or moderate pressure may pass out into the space between the glass sheets to perform a scavenging function. The basic function of the device 3 is however to maintain separation of the sheets at a desired value and to hold the sheets stationary and parallel during the injection of the sealing filament about so much of the periphery of the sheets as is left free by the device. As will presently be described, the apparatus of the invention insures that when the sealing filament has been applied about this fraction of the periphery, the sheets will remain in fixed relative position without the jig. The jig may therefore be withdrawn to permit completion of the sealing filament about the remaining portion of the periphery of the sheets.

Figure 2:
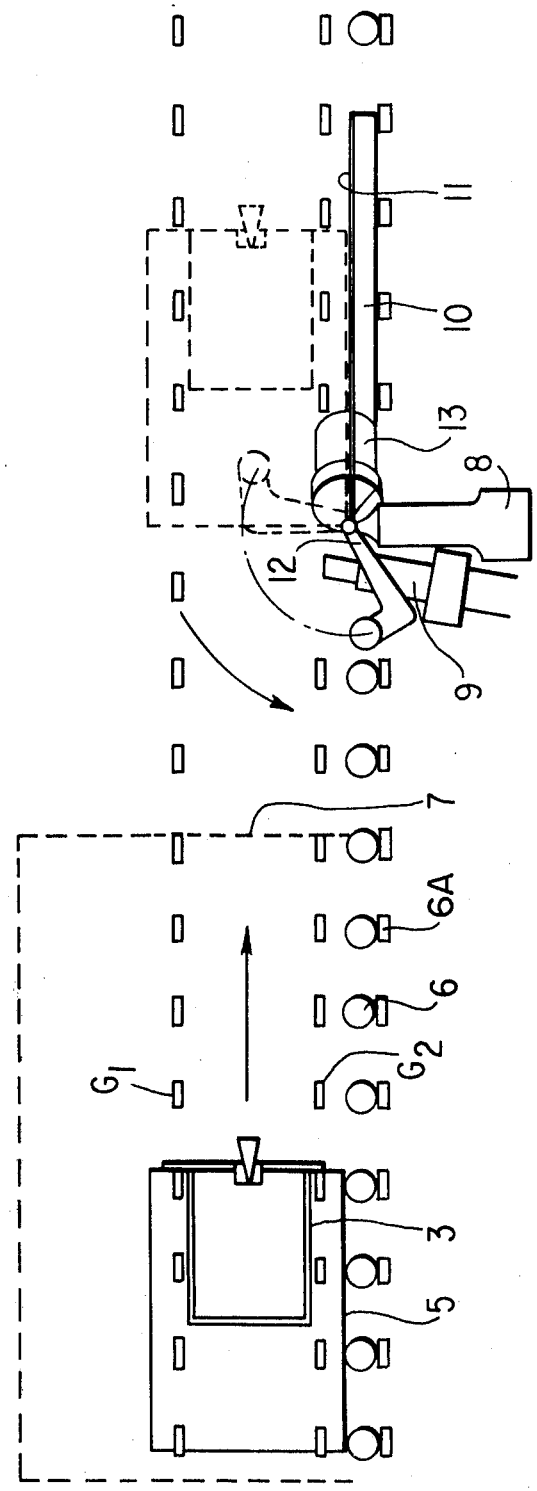
FIG. 2 is a diagrammatic representation of a complete installation according to the invention for the manufacture of multiple pane windows.

FIG. 2 is a diagrammatic representation of an installation according to the invention. In FIG. 2 the two sheets of glass, fixed with respect to each other by means of a clamping jig as illustrated in FIG. 1, constitute an assembly identified by the reference character 5. The assembly is disposed on a conveyor system such as a set of rollers 6 defining a path of travel for the assembly, preferably rectilinear. The roller driving means may be any conventional type such as direct gear drives connected to a plurality of parallel circuited electric motors 6A. The assembly, moving from left to right in FIG. 2, passes first through a heating means such as an oven diagrammatically indicated at 7. This oven heats the sheets to a temperature below the point of fusion of the sealing material to be applied thereto. The assembly then passes over a further heating means 9, a nozzle 8 further illustrated in FIG. 10, and thence over a cooling table 10 defining a continuation of the path of travel defined by the rollers 6. The surface tangent to the upper surface of the rollers 6 may thus lie in the upper surface of the table 10. The nozzle 8 may terminate at or below this surface. It is fed, for example by means of an extrusion machine, with a heat-fusible material at the desired temperature. The nozzle 8 injects between the two sheets of glass a bead or filament 15 of this material in a softened or fused condition.

Figure 10:
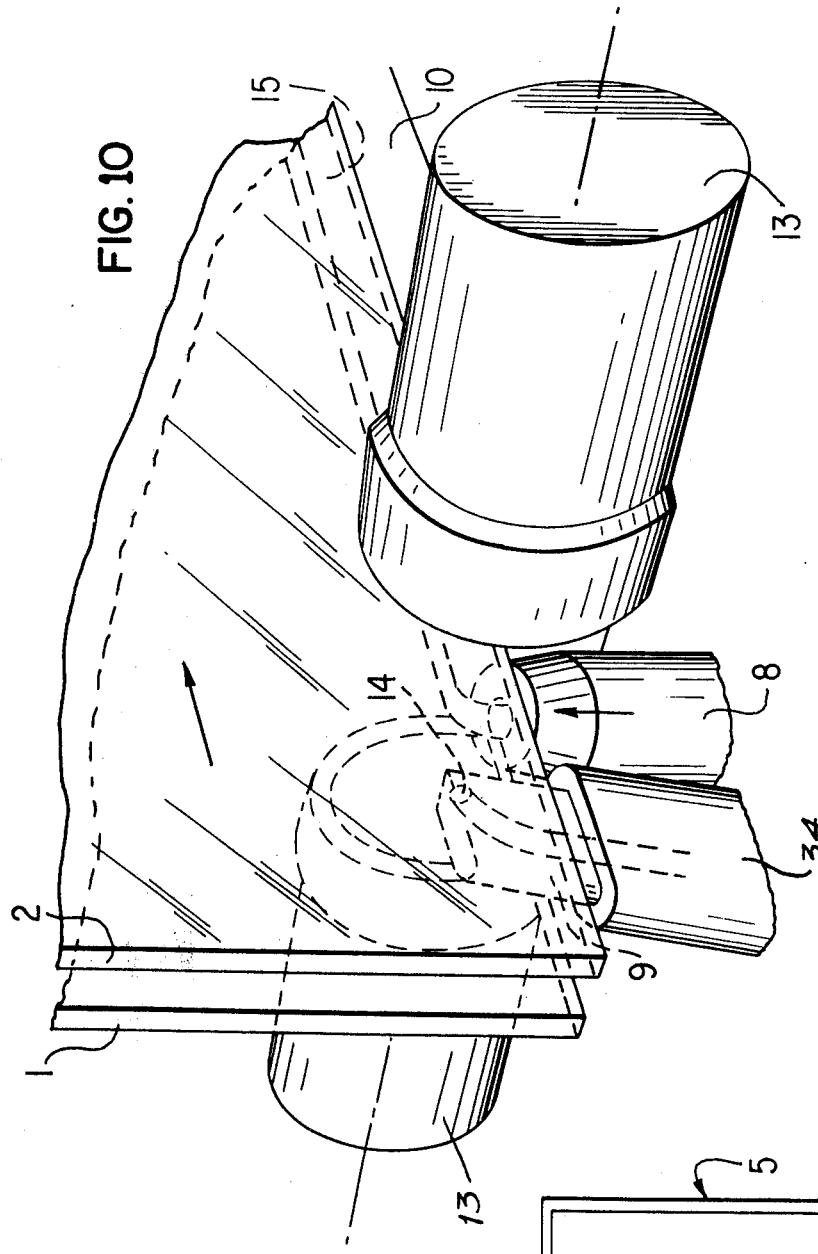
FIG. 10 is a detailed view of the injection nozzle of the invention shown together with an associated glass heating means and vapor withdrawing means.

As further shown in FIG. 10, supplementary heating means 9 are disposed immediately upstream of the nozzle 8, in the sense of advance of the assembly 5, and extend above the surface above-mentioned which is defined by the rollers 6 and cooling table 10. Heating means 9 thus extend between the two glass sheets, along the edges thereof resting on the rollers 6 and/or on the cooling table 10, and serve by conduction or radiation to bring to a desired temperature that portion of the facing surfaces of the sheets to which the sealing filament is to be applied by the nozzle 8. This temperature is chosen to insure a good wetting of the surfaces of the glass by means of the heat-fusible sealing material. For example, if the sealing material is injected at 180°C., the temperature of the glass may be in the vicinity of 100°C. The heating means 9 may take the form of stem or bar of thickness adapted to fit with small clearance between the sheets 1 and 2, as illustrated in FIG. 10.

Advance of the assembly 5 past the nozzle must be effected at constant speed to obtain satisfactory uniformity of the sealing filament 15. The speed is of course made a suitable function of the rate of supply of sealing material from the nozzle.

During its entire passage through the apparatus of FIG. 2, the assembly 5 is held with its sheets in substantially vertical planes by rows of guide rollers G1 and G2 turning on vertical axes. Down as far as the vicinity of the nozzle, the guide rollers G1 and G2 may be disposed in vertical alignment with the supporting rollers 6, as regards the lengthwise direction of travel of the glass. Immediately downstream of the nozzle 8 there is disposed the cooling table 10 to effect rapid cooling and thereby solidification of the sealing material which has been injected by the nozzle between the glass sheets of the assembly. The portion of the device 10 which (either directly or through the strip 27 of FIG. 11) comes into contact with the glass sheets and/or the sealing filament may be held for example at a temperature of 15°C. In order to permit the assembly to pass over the cooling table 10 without sticking between that device and the material of the filament, the upper surface of the table 10 may be provided with a coating of silicon-base material, of PTFE, or other slippery material to which the chilled sealing material will not adhere. Alternatively a flexible protective strip 27 may be unrolled, as in the embodiment of FIGS. 11 and 12, to fit between the cooling table and the assembly 5. This strip may remain adherent to the sealing material.

Figure 11:
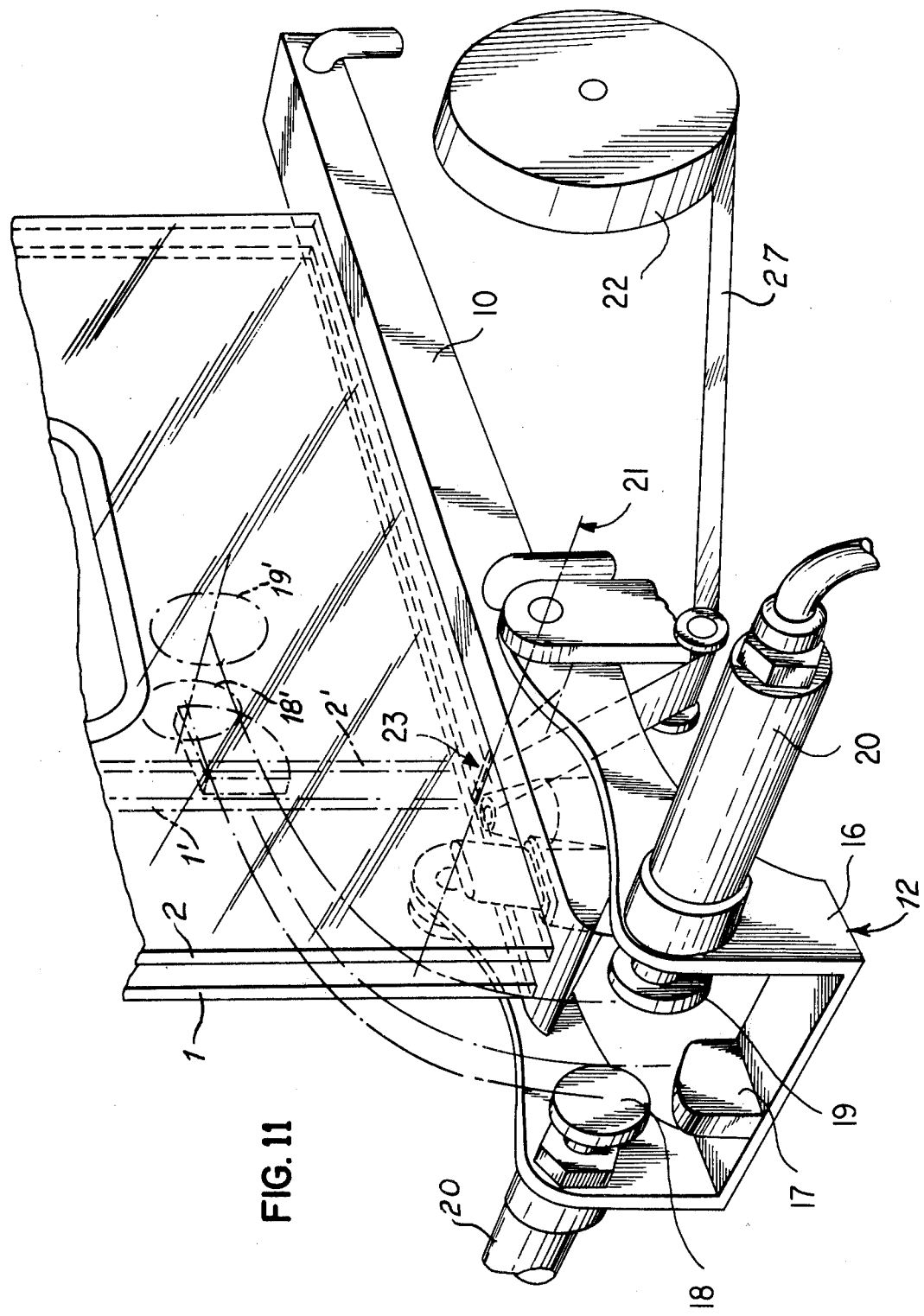
FIG. 11 is a diagrammatic view of an embodiment of the invention employing a stationary cooling table and a movable crank or stirrup for rotation of the assembly about its corners.

With the embodiment of FIGS. 2, 10 and 11, when one edge of a polygonal window assembly has been provided with its sealing bead, the window is rotated in its own plane by a device 12 about the trailing end of that edge, i.e. about one corner of the window, so that the injection may continue along the adjacent edge. Injection is briefly interrupted during the turning motion and then begins again so as to insure continuity of the filament past the corners of the assembly.

A supplementary heating system schematically indicated at 13 in FIG. 10 but omitted for clarity from FIG. 11 prevents the injected bead from cooling during turning of the assembly at its corners.

Before the last turning by the device 12 which precedes injection of the bead along the fourth side (of a rectangular window, say), the jig 3 is withdrawn, the correct separation of the glass sheets being now assured by the sealing material already in place.

Figure 9:
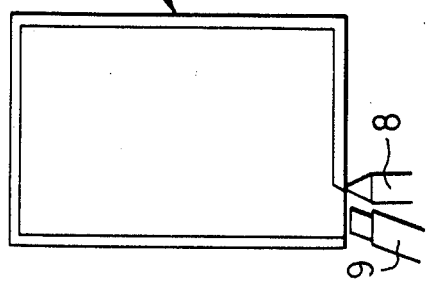

Upon completion of injection along the last edge but prior to injection at the last corner, all remaining extraneous structure between the two sheets, such as the heating element 9 is removed. For this purpose the heating means 9 may be retractable, below the surface defined by rollers 6 and cooling table 10, to the position shown for it in FIG. 9. Proper sealing of the last portion of the filament to the first portion thereof is made possible by reheating of the first portion to sufficient plasticity by the heating means 13.

It is however possible to leave a small opening or vent through the sealing filament so as to make possible the preservation of the same pressure inside as outside the window. If no such vent is left, and if the window is sealed with warm air between the panes, the result will be a less than atmospheric pressure when the assembly returns to ambient temperature. This subjects the assembly to a permanent stress which may be dangerous.

Figure 15:
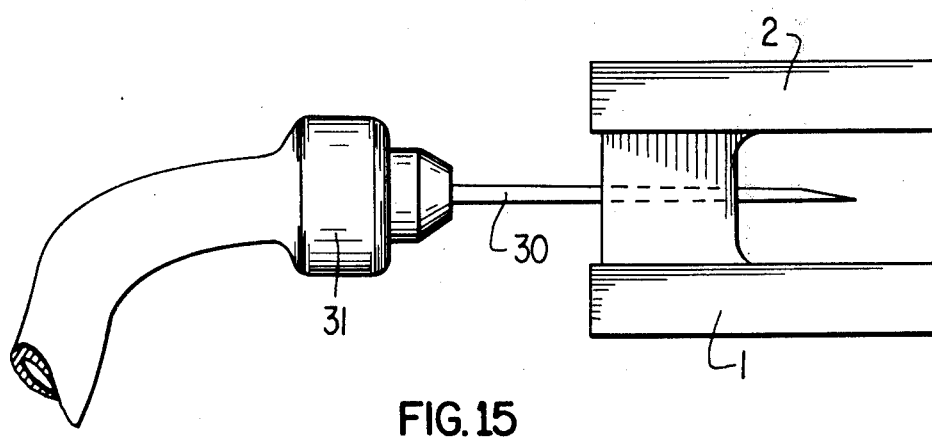
FIG. 15 illustrates injection according to the invention, by means of a heated hollow needle, of a gas intended to balance the internal and external pressures of the double pane window or to scavenge that volume.

It is consequently desirable to bring the pressure between the panes into equilibrium with that outside them as soon as the glass of the assembly has cooled. This may be achieved, as shown in FIG. 15, with the help of a heated hollow needle 30 similar to a hypodermic needle, connected to a conduit 31 providing dry air. Heating of the fusible sealing filament for penetration thereof by the needle may be obtained by application of a source of ultrasonic energy to the needle.

The successive positions imposed upon the assembly 5 for application of the sealing filament along its four edges are diagrammatically indicated in FIGS. 3 to 9 which show how the sealing bead is continuously applied. Thus, at the conclusion of the operation indicated in FIG. 3, wherein the filament is being applied along one long edge of the assembly, the assembly is rotated counterclockwise through 90° for application of the filament along one short edge. When this step, illustrated in FIG. 5, is completed, the assembly is again rotated 90° counterclockwise. FIG. 6 shows completion of application of the filament to the second long edge of the assembly. In FIG. 7 the assembly is unmoved from its position in FIG. 6, but the jig 3 has been removed. In FIG. 8, the assembly is being rotated again for application of the filament to the fourth edge.

The injection nozzle 8 is shown in FIG. 10. Immediately upstream of the nozzle along the path of motion of the assembly there is provided a heating element 9 comprising a flat-sided piece of brass or copper which is heated by a controllable electric resistance wire, disposed for example in a support 34. The heating element 9 is traversed by a passage 14 which opens toward the injection nozzle and which connects to a source of vacuum or partial vacuum for evacuation, from between the glass sheets 1 and 2, of smoke and vapor from the fusible sealing material. These vapors are desirably withdrawn to prevent condensation thereof on the adjacent faces of the glass sheets.

The bead or filament of injected sealing material is indicated in FIG. 10 at reference character 15.

In FIG. 10 radiant heating devices 13 are disposed on opposite sides of the assembly 5 adjacent the injection nozzle. These heating devices make it possible, upon turning of the assembly at a corner as indicated in FIGS. 4 and 8, to focus a heat flow on the sealing material already laid down so as to prevent it from cooling while the assembly is being thus turned.

FIG. 11 illustrates a turning device associated with a fixed cooling table 10. For clarity the heating elements 13 of FIG. 9 have been omitted from this figure.

When injection has been completed along one edge of the assembly, the translational motion thereof over the guide rollers 6 and cooling device 10 of FIG. 2 is interrupted so as to leave the corner of the assembly at the trailing end of that edge immediately above the injector 8. A pivoting stirrup 16 is thereupon lifted from its rest position (shown in full lines in FIG. 11) until a spacer stop 17 thereof is inserted between the sheets of glass along the edges thereof next to be sealed. In FIG. 11, the sheets of glass 1 and 2 of the assembly 5 are shown in full lines at a phase just preceding completion of the filament along the lower horizontal edge of the assembly. They are shown in chain lines identified by reference characters 1' and 2' at the position of such completion, in which translation of the assembly stops preparatory to rotation. In this position, the corner of the sheets about which rotation is to take place is substantially aligned with the axis of rotation 21 of the stirrup 16.

The stirrup, rotatable about the axis 21, includes a clamping device comprising pads 18 and 19 movable toward and away from each other by operation of pneumatic or hydraulic cylinders 20. When the assembly is to be turned, the stirrup is rotated clockwise, in FIG. 11, through 90° or more until the bottom of the stirrup brings up against the vertical edges of the sheets as seen at 1' and 2' in that figure. The spacer pad 17 is now between the sheets, and the pads 18 and 19 are pressed against the sheets, as indicated by the chain line showings at 18' and 19'.

The assembly 5 is now held fast in the stirrup, and the latter is rotated back counterclockwise, carrying the assembly 5 with it, so as to bring the edge of the assembly which is vertical in FIG. 11 into working relation with the heater 9, nozzle 8 and cooler 10.

The cooling table 10 comprises a hollow metallic body through which a coolant is circulated so as to maintain the upper surface thereof at a specified temperature. As already indicated, this surface may be coated with a non-stick coating. Instead, a protective and lubricating strip 27 may be provided which will adhere to the fusible joint but which will not stick to the cooling element. This strip is delivered from a spool 22 through a slot 23 provided in or upstream of the cooling table 10, in the vicinity of the injection nozzle, so that the strip will come to engage the edges of the glass sheets and the sealing bead additionally protecting the edges of the glass sheets from mechanical shock and preventing the entry of water vapor between them.

Figure 12:
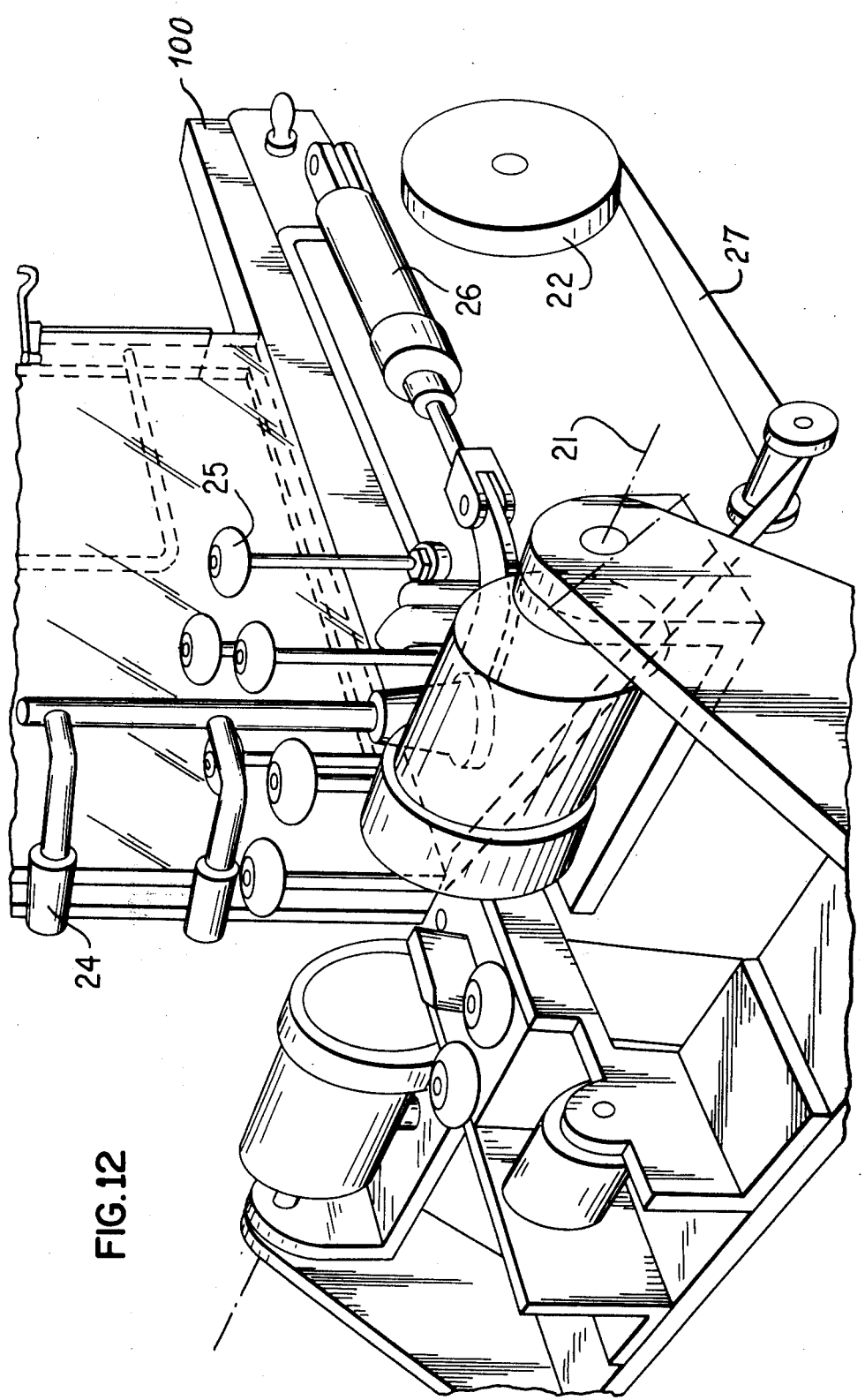
FIG. 12 is a diagrammatic view of another embodiment of the invention employing for cooling of the filament a movable table which serves also to rotate the assembly in the plane of its sheets about the corners of the assembly.

FIG. 12 illustrates another embodiment in which the cooling table, identified by reference character 100, carries with it the assembly 5 to effect rotation of the latter at its corners. In FIG. 12 the cooling table therefore constitutes part of the rotating mechanism, generally indicated at 12 in FIG. 2 and including in the embodiment of FIGS. 2, 10 and 11 the crank or stirrup 16 and associated elements of structure.

In FIG. 12, the cooling table 100 is supported for rotation about the axis 21. To avoid slippage of the glass sheets on the cooling element 100 during such rotation, a set of stops 24 controlled by a hydraulic cylinder 26 holds the glass assembly in its own plane during the rotation. Adjustable lateral rollers 25 may be provided to exert a suitable low pressure on the glass sheets during application of the sealing filament so as to hold the separation of the sheets closely to a desired value.

Various modifications may be made in the embodiments hereinabove described without departing from the scope of the invention as hereinafter defined in the appended claims. Thus for example, it is possible to substitute the apparatus shown in FIGS. 13 and 14 for the jig 3 in the assembly shown in FIG. 1. In the embodiment of FIGS. 13 and 14 the jig, generally indicated at 28, comprises a fork 29, the tines of which are spaced so as to accommodate the sheets of glass 1 and 2 at the desired separation. An inflatable bladder 35 is disposed between the tines of the fork and connects to a fitting 36 through which the bladder may be inflated. With the bladder deflated, the fork is fitted over two glass sheets for the manufacture of a window in accordance with the invention. The bladder is then inflated to hold the sheets in fixed relative position, as with the jig of FIG. 1.

The invention can also be applied to the manufacture of multiple pane windows which are not polygonal in shape, but which may for example be circular. For such a purpose, the shape of the cooling table and the disposition of the rollers 6 may be modified to provide a profile conforming to the edge of the sheets.

More generally, the invention comprehends all modifications of and departures from the apparatus hereinabove described properly falling within the spirit and scope of the appended claims.

I claim:

1. Apparatus for the manufacture of multiple pane windows of polygonal shape, said apparatus comprising means defining a rectilinear path of travel for a pair of edges of a pair of transparent sheets supported parallel to, in fixed position, and substantially in register with respect to each other, means disposed adjacent an upstream portion of said path to heat said edges upon passage thereof along said portion, a nozzle having an orifice disposed downstream of said heating means to inject a sealant between said edges, cooling means disposed along said path downstream of said heating means and nozzle to abstract heat from said sealant, crank means pivoted about a fixed axis transverse of said path and substantially intersecting the orifice of said nozzle, and means on said crank means to grip said sheets upon arrival of the trailing end of said edges substantially at said axis, whereby said sheets may be rotated by said crank means in the plane thereof about said axis with said axis substantially intersecting the trailing end of said edges to present another pair of the edges of said sheets to said path.

2. An apparatus according to claim 1 including means interposed between said cooling means and said sealant to prevent the sealant from adhering to the cooling means.

3. An apparatus according to claim 1 including a supplementary heating means beaming radiant heat at the location of the injection nozzle orifice to focus a heat flow on the injected eealant at the trailing end of said edges as the sheets are rotated thereabout.

4. An apparatus according to claim 1 in which said heating means is located within the path of the injected sealant and is retractable therefrom whereby it will avoid direct contact with the sealant on the forward end of the first sealed edge as it reappears at the end of the rotation cycle.

5. Apparatus for the manufacture of multiple pane windows comprising removable means to hold a pair of glass sheets of substantially the same polygonal shape and dimensions in fixed position with respect to each other and substantially in register with each other at a fixed separation from each other, means defining a path of travel for a pair of sheets so held, means to heat an edge of each of the sheets of the pair upon motion of the pair lengthwise of said path past said heating means, a nozzle adjacent said heating means for injection of a heat fusible sealant between the sheets of the pair at the edges so heated, said nozzle being disposed along said path downstream of said heating means in the direction of said motion, said path-defining means including cooling means movably disposed along said path downstream of said heating means and nozzle, said cooling means being pivoted about a fixed axis transverse of said path and substantially intersecting the orifice of said nozzle to rotate said sheets in the plane thereof upon arrival of the trailing end of said edges substantially at said axis, and means for supporting said sheets in fixed position on said cooling means during rotation of said sheets.

* * * * *